United States Patent [19]

Nelson et al.

[11] 4,085,682
[45] Apr. 25, 1978

[54] VEHICLE SHOCK ABSORBING ARTICULATED JOINTED SUSPENSION

[75] Inventors: Robert C. Nelson; David Toney, both of Bluefield, W. Va.

[73] Assignee: New River Manufacturing Company, Inc., Glen Lyn, Va.

[21] Appl. No.: 748,639

[22] Filed: Dec. 8, 1976

[51] Int. Cl.² .................. B61F 3/00; B61F 5/16; B61F 5/30; B61F 5/50
[52] U.S. Cl. ................... 105/157 R; 105/136; 105/218 R; 105/224 R
[58] Field of Search ............... 64/21; 105/79, 80, 81, 105/136, 157 R, 161, 182 R, 218 R, 224 R; 180/42, 73 R; 267/20 A, 20 R; 280/81 R, 81 A, 81 B, 109, 110, 111, 112 R, 112 A, 725; 105/136,157 R, 218 R, 224 R

[56] References Cited

U.S. PATENT DOCUMENTS

| 2,005,562 | 6/1935 | Ruth | 105/80 X |
|---|---|---|---|
| 2,020,756 | 11/1935 | Woodard | 105/80 |
| 2,336,814 | 12/1943 | Sutter | 280/81 R X |
| 2,753,190 | 7/1956 | Hooven | 280/112 R |
| 2,890,063 | 6/1959 | Stover | 280/112 R X |
| 3,067,698 | 12/1962 | Lee et al. | 105/224 X |
| 3,473,821 | 10/1969 | Barenyi et al. | 180/73 R X |

FOREIGN PATENT DOCUMENTS 907,254   3/1954   Germany ................. 280/109

*Primary Examiner*—Drayton E. Hoffman
*Assistant Examiner*—Howard Beltran
*Attorney, Agent, or Firm*—McCaleb, Lucas & Brugman

[57] ABSTRACT

An axle housing has a longitudinal pivotal connection to the frame enabling it to rock about an axis extending generally longitudinally of the direction of movement of the vehicle. One of the fore and aft sides of the axle housing has a transverse pivotal connection to the frame enabling the axle housing to tilt up and down, in addition to rocking about the longitudinal pivotal connection. Spring means support the frame at the opposite side of the axle housing. The combination of rocking about the longitudinal pivotal connection, and up and down tilting about the transverse pivotal connection, absorbs shocks due to irregularities in the track or ground. The invention is applicable to non-railway vehicles, as well as the railway-type vehicles shown.

5 Claims, 7 Drawing Figures

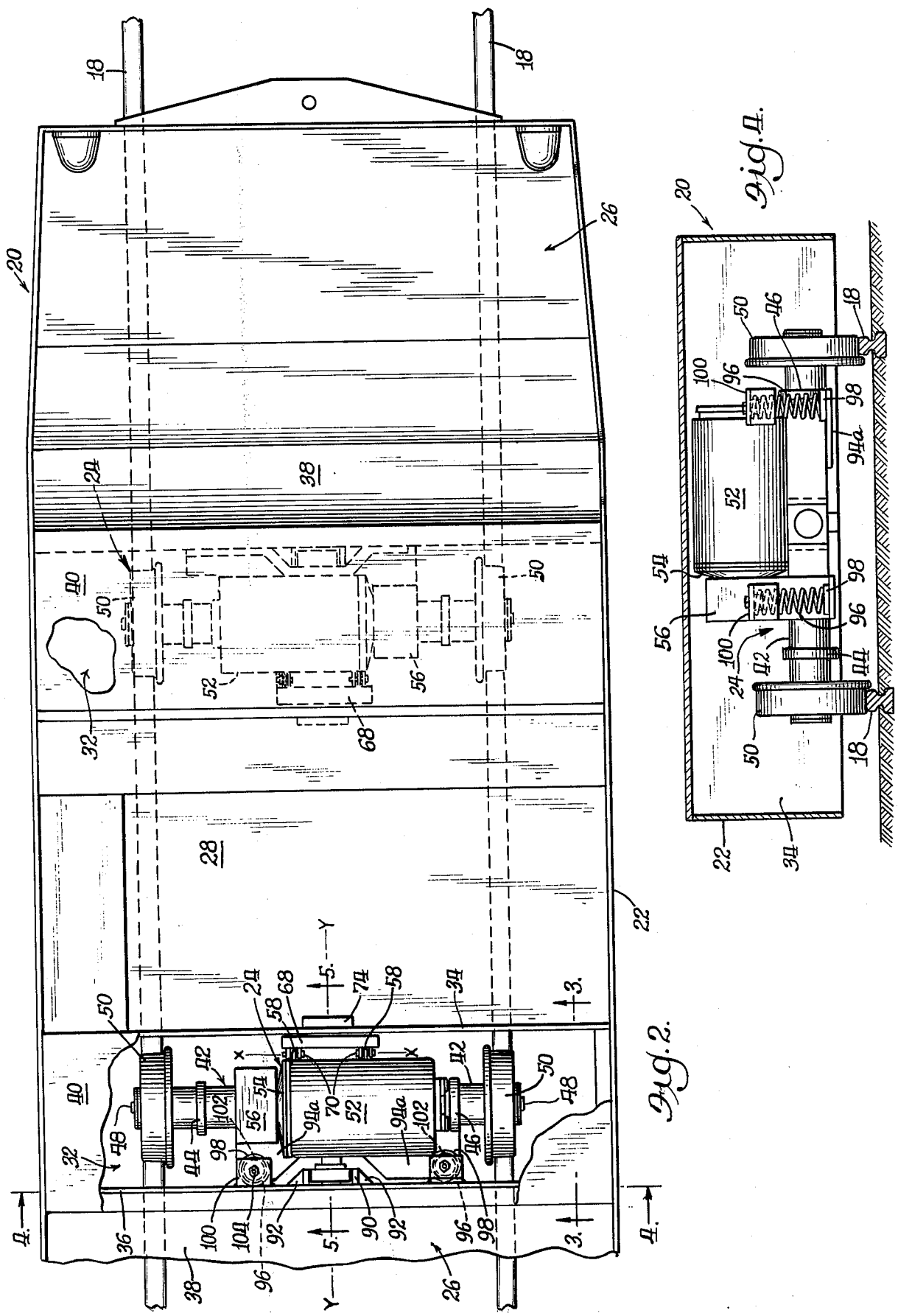

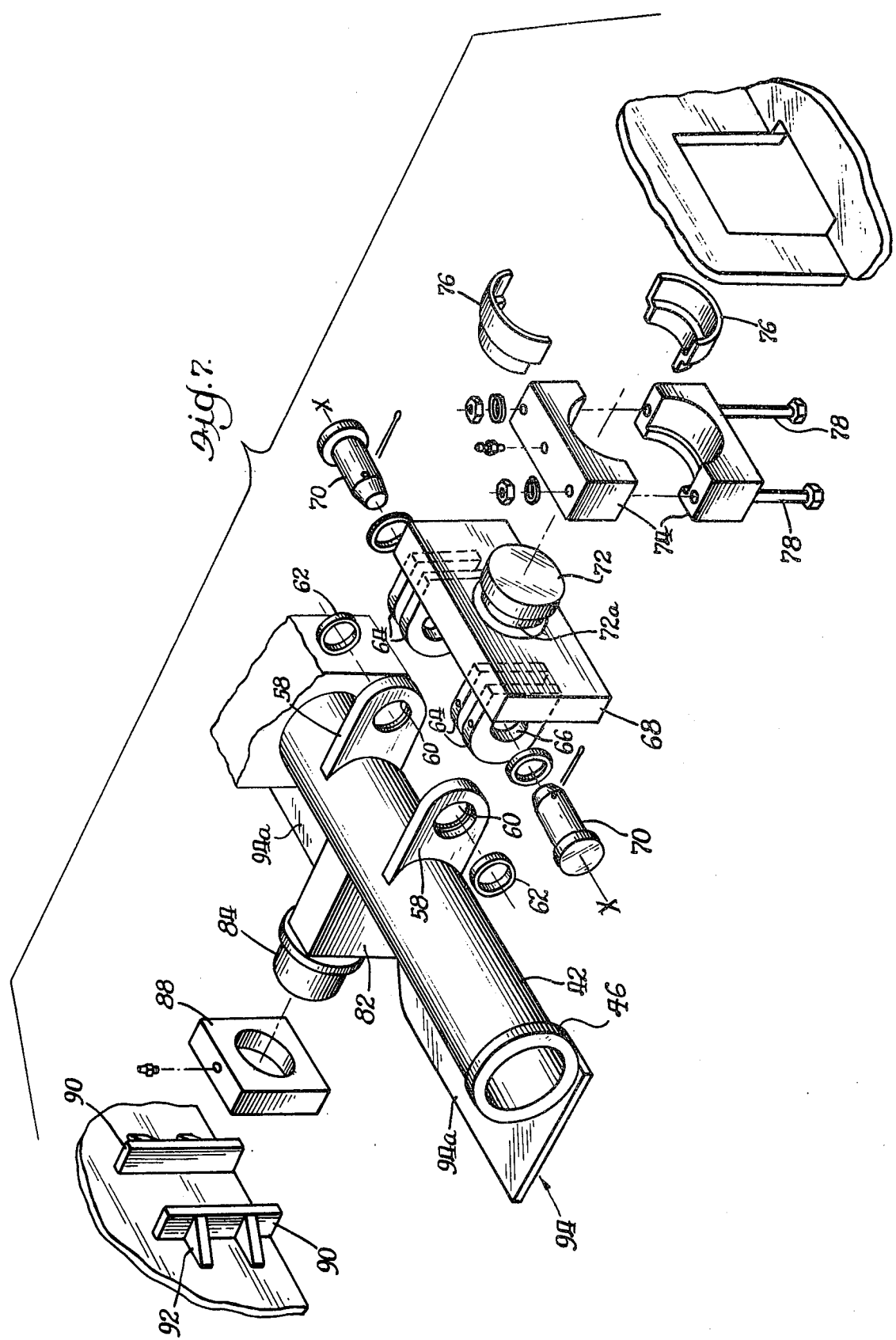

VEHICLE SHOCK ABSORBING ARTICULATED JOINTED SUSPENSION

BACKGROUND OF THE INVENTION

The invention pertains to suspensions for railway and non-railway vehicles, for cushioning shocks on an axle assembly caused by irregularities in the track or ground, before they can be transmitted to the frame.

Personnel, and some supplies, are transported about underground mines in battery-or trolley-powered personnel cars, sometimes called portal buses, having flanged railway-type wheels running on mine track. Most mine track undulates because it is not economical to install it with above-ground precision, or to lay on a deep, stable foundation. And, once installed, the track condition worsens in use because of irregular heaving or swelling of the mine bottom, roof falls, and the constant back and forth movements of mine cars and locomotives. It is not unusual in a modern large mine for men to be transported in personnel cars as much as three to five miles to their working places. This can require a ride of up to an hour at the beginning of the shift and again at the end of the shift, during which time the miners are confined to the car, often in prone or crouched positions to clear the roof and supporting beams.

Up to a few years ago, men were transported to and from the working place in empty mine cars. Sometimes they walked, or even crawled part way. Use of mine cars and locomotives for this purpose diverted production machinery from its primary purpose; further, cars made for hauling and dumping coal and ore were not comfortable and sometimes not even safe. Occasionally, to go between working areas during a shift, a few men would hitch a ride on the top of a spare locomotive or in a mine car which, designed for one operator and one or two helpers, was not safe for several more. It has been only recently that special personnel cars have been made just for transporting men, andthey are manufactured strictly for that purpose with comfort features such as cushioning and roominess secondary. In some personnel cars, one or more axles are trunnion-mounted, rocking about longitudinal pivotal connections to the frame in the center of the car. This eliminates the requirement for journal boxes and allows the vehicle to adapt to varying track conditions and to negotiate curves without derailment. It saves cost and in some cases lowers the headroom required for the car. However, although the trunnion mount enables the axle assembly to rock about pivotal connections to accommodate up and down irregularities in the track or ground, the pivotal connections fore and aft of the axle housing are solidly connected to the frame and transmit shocks, uncushioned, directly from the axle assembly to the frame and to the men riding inside. This can be most uncomfortable on a long trip underground, especially when it is repeated day after day.

SUMMARY OF THE INVENTION

It is a general object of the present invention to provide, in a vehicle having an axle assembly rockably connected to the frame about a longitudinal pivotal connection, an additional, spring-loaded, transverse pivotal connection between the frame and the axle housing enabling the axle housing to tilt up and down to cushion shocks by a compound motion resulting from the combination of rocking and tilting movements about the longitudinal and transverse pivotal connections respectively.

Another object, in such a vehicle, is to provide vertical guide means between the frame and the side of the axle housing opposite the transverse pivotal connection, to limit relative sidewise movement between the axle housing and the frame while enabling relative vertical movement.

Another object is to provide such vertical guide means in the form of a vertical guide on the frame engaging an arm on the side of the axle housing opposite the transverse pivotal connection.

Another object is to provide a slide block engaging the vertical guide, and a longitudinal pivotal connection between the axle housing arm and the slide block, thereby providing longitudinal pivotal connections on both fore and aft side of the axle housing, one of these longitudinal pivotal connections being vertically movable to cushion shocks through springs.

Another object is to provide, in such a vehicle, first and second connections fore and aft respectively of the axle housing, the first connection comprising a cylindrical bushing in the frame on one side of the axle housing, bracket means having a first trunnion swivelably journaled within that bushing and being pivotally connected to the axle housing along a transverse pivotal connection, and the second connection comprising a second trunnion extending from the opposite side of the axle housing and swivelably journaled within a slide block guided for vertical movement along the frame.

Another object in such a vehicle is to provide connecting means between the axle housing and frame comprising a trunnion extending from the axle housing swivelably journaled in a swivel block about an axis extending generally longitudinally of the direction of the movement of the vehicle, the swivel block being pivotally connected to the frame for up and down tilting movement about an axis extending transversely of the direction of movement of the vehicle.

Other objects and advantages will be apparent from the following description taken in connection with the accompanying drawings in which:

BRIEF DESCRIPTION OF THE DRAWINGS

FIG. 2 is a plan view of FIG. 1 with a portion removed to show a preferred form of suspension means incorporating the present invention;

FIG. 4 is a fragmentary vertical section of FIG. 2 taken along the line 4—4, with the facing vertical wall removed;

FIG. 7 is an exploded perspective view of a portion of the mechanism shown in FIGS. 1-5.

Like parts are referred to by like reference characters.

DESCRIPTION OF THE PREFERRED EMBODIMENT

Figure 1:
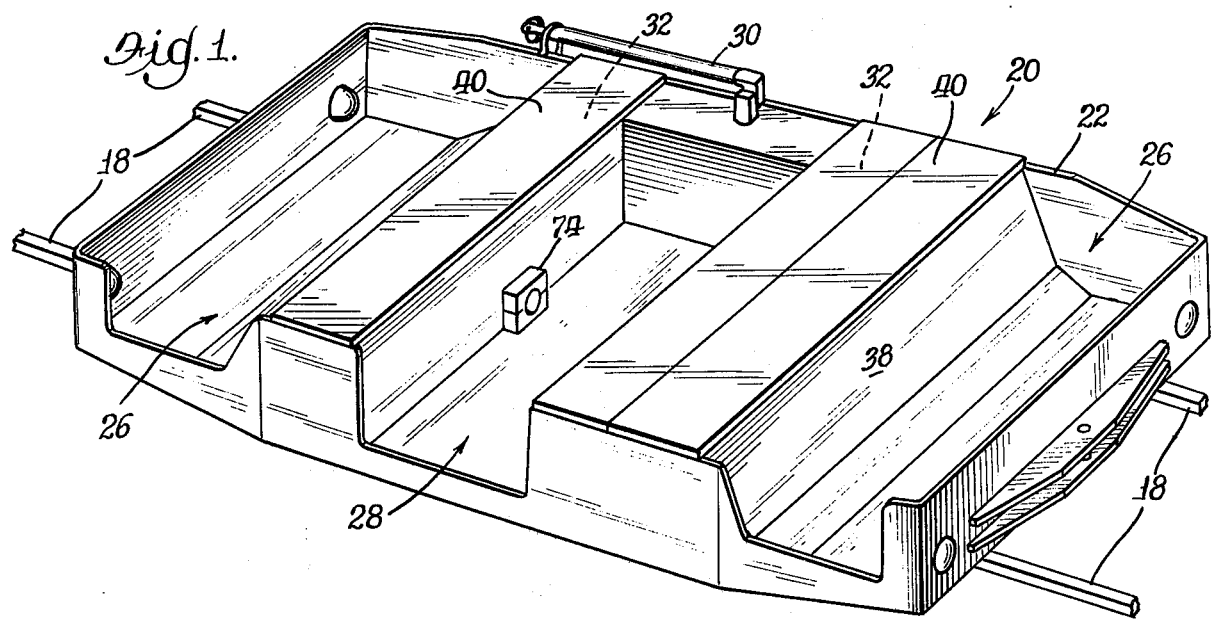
FIG. 1 is a perspective view of a personnel car or portal bus for underground mining illustrating one type of vehicle with which the present invention can be used.

The vehicle chosen to illustrate the invention, generally designated 20, is a personnel car or portal bus. It runs on railway-type tracks 18 to transport men into and about underground mines. One of the major current applications is in coal mines.

The vehicle has a frame or body 22 mounted on a pair of axle assemblies 24 by suspension means which is the subject of the present invention. The frame illustrated is conventional and will not be described in detail. Briefly, however, it includes personnel compartments 26 at both ends and a central operator's compartment 28. The particular vehicle shown is a low unit having an overall height of about 26 inches so men riding in it must take semi-reclining positions to clear the roof and roof-supporting structures. A trolley 30 supplies electrical power from the usual trolley wire (not shown) running along the tracks.

The term "longitudinal" and "transverse" and their adverbial forms used in this description and in the claims will refer to horizontal directions which are generally parallel to the direction of movement of the vehicle and generally transverse thereto, respectively. For example, each of the two axle compartments 32, 32 in the frame is defined by a pair of "transverse", vertical wall plates 34 and 36. And they are "longitudinally" spaced, meaning they are spaced apart along the longitudinal axis of the vehicle. The top edge of plate 36 is below the top of the frame, allowing room for the upper portion of an inclined contoured, back-rest plate 38 in the adjacent personnel compartment 26. A top plate 40 closes each compartment 32.

The operator's compartment 28 is shown without any of the usual tramming, braking, and other controls because they comprise no part of the present invention. It will be understood that because the vehicle is reversible, either end will be the "front" or "rear" depending on the direction of travel. Because the operator's compartment is midway between the ends of the machine, he can readily see either way and control movement in either direction.

Referring now to the axle assembly 24, this comprises a generally cylindrical cross-section axle housing 42 with opposite hubs 44 and 46 rotatably journaling an axle 48 having flanged railway-type wheels 50 at the ends. An electrical motor 52 is removably mounted on a circular flange 54 supported on a gear box 56 which is fastened as by welding solidly to the axle housing 42. When electrically energized through trolley 30 by the controls in the operator's compartment, the motor 52 rotates the axle 48 in one direction or the other at a selected speed. There is a conventional gear train transmission (not shown) between the motor and axle.

Suspension means whereby the axle assembly 24 is pivotally mounted relative to the frame about separate transverse and longitudinal axes respectively is the subject of the present invention. This will now be described.

Figure 3:
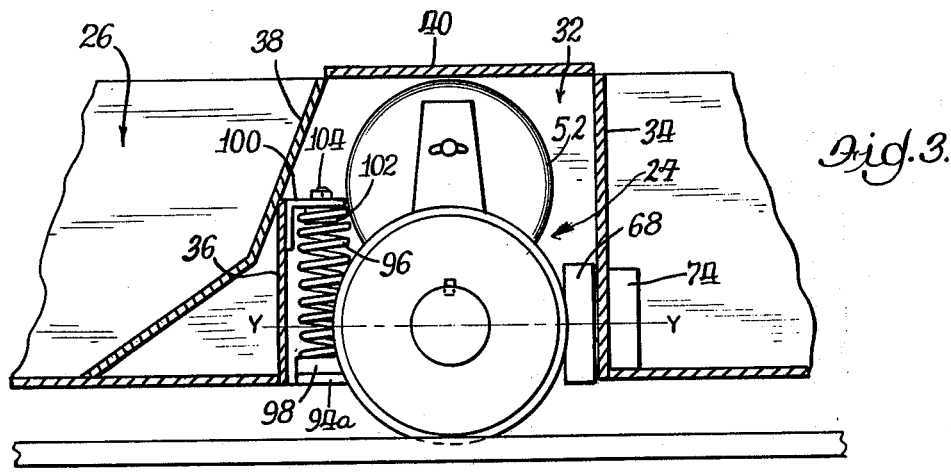
FIG. 3 is a fragmentary vertical section of FIG. 2 taken along the line 3—3.

Fastened as by welding to one side of the axle housing 42 are two vertical, longitudinal lugs 58, 58 having aligned pivot holes 60, 60 with appropriate anti-friction bushings 62, 62, therein. Companion pairs of vertical, longitudinal lugs 64, 64, with pivot holes 66, 66 are fastened as by welding to the side of rectangular mounting bracket 68. Each pair of lugs 64, 64 are pivotally connected to a corresponding one of the lugs 58 by a pivot pin 70. The pivot pins 70 are aligned along a transverse axis X—X. A first cylindrical trunnion 72 is attached as by welding to the mounting bracket 68. This is rockably journaled within a first trunnion mount 74 which is affixed as by welding 75 into an opening in vertical wall plate 34. The first trunnion 72 provides a rockable mount about the longitudinal axis Y—Y (FIGS. 2, 3 and 5).

Figure 5:
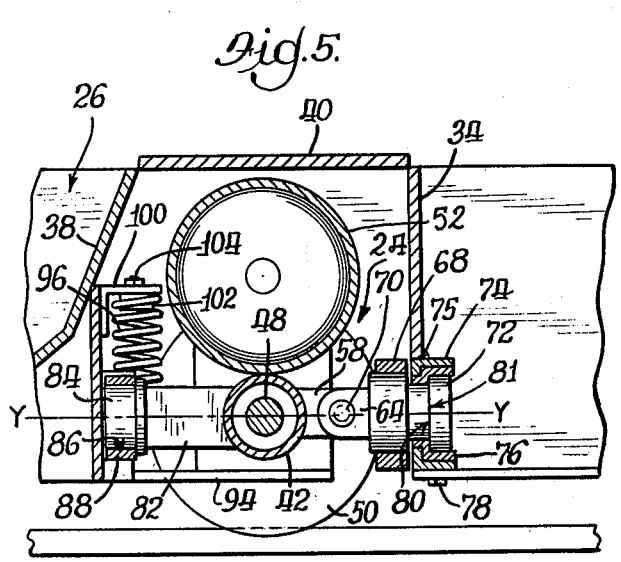
FIG. 5 is a fragmentary vertical section of FIG. 2 taken along the line 5—5.

As best shown in FIGS. 5 and 7, a bushing 76 (preferably brass) is interposed between the first trunnion 72 and the first trunnion mount 74. For assembly purposes, the trunnion mount 74 and bushing 76 are each made in two pieces as shown in FIG. 7. Only the upper half of the trunnion mount 74 is welded (at 75) to the plate 34, the bottom half being fastened to it by bolts 78. The trunnion 72 has an external groove 72 a. The trunnion mount and bushing are shaped correspondingly to the trunnion 72 to provide shoulders limiting endwise movement of the axle assembly along longitudinal axis Y—Y. Specifically, shoulder 80 in the trunnion 72 engages shoulder 81 in the bushing, limiting movement of the axle assembly to the left as shown in FIG. 5; and engagement of the mounting bracket 68 with the wall plate 34 limits movement in the other direction.

At the opposite side of the axle housing 42, there is a longitudinal arm 82 with a second trunnion 84 at its end. This is rockably journaled within a bore 86 in a slide block 88, preferably made of bearing material such as brass. The slide block 88, while providing the second trunnion connection on the opposite side of the axle housing, also aligned with the first trunnion connection, also enables that opposite side to tilt up and down about transverse axis X—X by reason of vertical guide means here illustrated as a pair of transversely spaced vertical guides 90, 90 welded to gussets 92 which in turn are welded to the wall plate 36. The guides 90 prevent transverse horizontal movement of the opposite side of the axle housing but enable it to move freely up and down to accommodate undulations in the tracks as will be described.

Also extending from the opposite side of the axle housing (to the left in FIG. 5) is a horizontal base plate 94 affixed as by welding to the bottom thereof. As shown in the plan view of FIG. 2, this plate is cut away at the center to clear the vertical guide elements 90 and 92 and has two transversely spaced end sections 94a which serve as a base for supporting vertical compression springs 96 on spring pads 98. The tops of the springs bear against the undersides of angle members 100 affixed as by welding to the wall 36. Spring retainer plugs 102, held by bolts 104 fit inside the upper ends of the springs and keep them in place.

By the structure above described, the load of the vehicle frame will be applied to each axle assembly 24, first, through the pivot pins 70 which permit no relative up and down movement and, second, through the springs 96 which permit some cushioning, relative vertical movement.

In operation, as the personnel car moves along tracks 18, the axle assembly 24 will rock sidewise about the longitudinal axis Y—Y, between the first and second trunnions 72 and 84 respectively. This cushions the body against shock and twisting caused by the kind of undulations in which the track levels change individually, for example where there is a sudden rise or sag in one track but not the other. Rocking of the axle assembly about axis Y—Y absorbs shock where the track surface levels undulate but their average remains the same. As a practical matter, this is seldom the case, because level changes affect both tracks differently, so a raise in one seldom if ever precisely cancels out an identical drop in the other. In other words, the average level changes constantly. For absorbing this kind of shock, the tilt about the transverse axis X—X is most effective. A sudden lift, where both ends of the axle assembly abruptly rise at the same time, causes upward movement of the slide block 88 between its guides, at a rate determined by the strength of the springs 96, and cushions the impact transmitted to the frame and to the personnel inside. This construction has resulted in a substantially improved ride for people obligated to go into and about underground mines.

Figure 6:
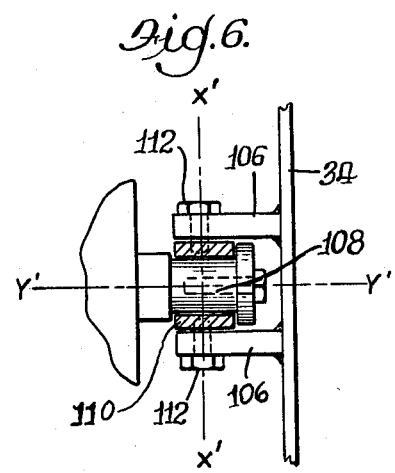
FIG. 6 is a fragmentary plan view of an alternative form of transverse pivotal connection between the axle housing and frame.

An alternate form of transverse pivotal connection is shown in FIG. 6. Here, bracket means comprising lugs 106, 106 are welded to the wall 34. A trunnion 108, comparable to 84, is rockably journaled within swivel block 110 about a longitudinal axis Y'—Y'. The swivel block is pivoted for up and down tilting movement about transverse axis X'—X' by pivot bolts 112 which are fastened to the lugs 106 and have inner end portions pivotally engaging the swivel block.

While one preferred embodiment of the improved shock absorbing vehicle suspension has been shown and described, and one alternate construction for the transverse pivotal connection has been shown and described, it will be apparent to those skilled in the art that other specific constructions and arrangements are possible within the scope and spirit of the invention as covered by the following claims.

The embodiments of the invention in which an exclusive property or privilege is claimed are defined as follows:

1. In a vehicle, a frame, an axle assembly having an axle housing with a wheel supporting axle rotatably journaled therein, wheels at the ends of said axle, connecting means mounted on the frame by trunnion means which provide a pivotal connection about a fixed axis extending generally longitudinally of the direction of movement of the vehicle; improved ride suspension means comprising:

separate means for pivotally securing said connecting means to one side of the axle housing about a horizontal axis intersecting and extending generally transversely of the longitudinal axis, support means at the other side of said axle housing being tiltable up and down about said transverse pivotal connection, and spring means mounted on said support means for supporting said frame for cushioned up and down movement, whereby shocks applied to the axle housing through the wheels are absorbed by rocking of the axle assembly about said longitudinal axis and by up and down tilting movement of said transverse pivotal connection within a range permitted by said spring means.

2. In a vehicle, improved ride suspension means according to claim 1 including:

vertical guide means between the vehicle frame and said other side of the axle housing limiting relative sidewise movement while enabling relative vertical movement between the axle housing and frame.

3. In a vehicle, improved ride suspension means according to claim 2 in which said vertical guide means includes:

a vertical guide on the frame, and an arm on said other side of the axle housing having means engaging said vertical guide.

4. In a vehicle, improved ride suspension means according to claim 3 in which:

said means for engaging said vertical guide comprises a slide block slidably engaging said vertical guide, and means providing another longitudinal pivotal connection, between said arm and said slide block, to limit sidewise movement of said opposite side of the axle housing, while enabling rocking thereof about the longitudinal pivotal connections on both sides of the axle housing.

5. In a vehicle, improved ride suspension means according to claim 1 in which:

said trunnion means includes first and second connections fore and aft respectively of said axle housing;

said first connection comprising a cylindrical bushing in said frame on said one side of the axle housing, said bushing being on said horizontal axis extending generally longitudinally of the direction of movement of the vehicle, said connecting means comprising bracket means having a first trunnion swivelably journaled within said bushing, and said second connection comprising an arm extending from said other side of the axle housing, said arm having a a second trunnion swivelably journaled within a slide block, said slide block being guided for vertical movement by vertical guide means on said frame.

* * * * *

UNITED STATES PATENT OFFICE
CERTIFICATE OF CORRECTION

Patent No. 4,085,682   Dated April 25, 1978

Inventor(s)   Robert C. Nelson

It is certified that error appears in the above-identified patent and that said Letters Patent are hereby corrected as shown below:

Column 1, line 15, after "lay" add--track.

Signed and Sealed this

Twenty-second Day of August 1978

[SEAL]

Attest:

RUTH C. MASON
Attesting Officer

DONALD W. BANNER
Commissioner of Patents and Trademarks